United States Patent [19]

Walters

[11] 4,196,698

[45] Apr. 8, 1980

[54] HOPPERS FOR SUPPLYING FOOD TO LIVESTOCK FEEDING TROUGHS

[75] Inventor: Anthony G. Walters, Ford, near Shrewsbury, England

[73] Assignee: Salopian Industries (Metals) Limited, Shrewsbury, England

[21] Appl. No.: 912,193

[22] Filed: Jun. 5, 1978

[30] Foreign Application Priority Data

Jun. 4, 1977 [GB] United Kingdom ............... 23843/77

[51] Int. Cl.² ................................................ A01K 5/00
[52] U.S. Cl. ................................................ 119/52 B
[58] Field of Search ................ 119/52 B, 52 AF, 52 R

[56] References Cited

U.S. PATENT DOCUMENTS

| 2,605,743 | 8/1952 | Scott, Jr. | 119/52 B X |
| 2,786,447 | 3/1957 | Murray | 119/52 B |
| 3,985,105 | 10/1976 | Smith | 119/52 B |

*Primary Examiner*—Louis G. Mancene
*Assistant Examiner*—Daniel J. Leach

*Attorney, Agent, or Firm*—Scrivener, Parker, Scrivener and Clarke

[57] ABSTRACT

A hopper for supplying food to a livestock feeding trough has a food levelling device at its outlet which comprises a downward extension of the outlet with side and end walls which is supported from the main body of the hopper by spring-loaded means which allow the extension to move vertically relative to the outlet and normally urge the extension downwards. The spring-loaded means may comprise guide rods which are slideable in brackets mounted on the main body, are secured to the extension and are fitted with compression springs which act between the brackets and the guide members. When the hopper is mounted over a trough for use the extension is urged by the spring-loaded means to rest on the trough at all times as the hopper travels along the trough. This ensures that a constant level of food is discharged into the trough as the hopper travels along it regardless of any variations in the heights of the trough and the main body of the hopper during the travel of the hopper along the trough.

14 Claims, 5 Drawing Figures

HOPPERS FOR SUPPLYING FOOD TO LIVESTOCK FEEDING TROUGHS

This invention relates to hoppers for supplying food to livestock feeding troughs.

The hoppers usually travel along the troughs they supply. The food is discharged into the trough from an outlet at the bottom of the hopper and the amount of food discharged is dependent at least in part upon the height of the outlet above the bottom of the trough. A problem is that the height of the outlet above the trough bottom can vary as the hopper travels along the trough, for example, because the trough is not supported at a constant level throughout its length or the path along which the hopper travels is insufficiently level, and this causes undesirable variations in the discharge of the food from the hopper.

The present invention seeks to overcome this problem.

The present invention consists in a hopper for supplying food to a livestock feeding trough comprisig a main body having at its outlet a food levelling device which comprises a downward extension of the outlet having side and end walls, and is supported by the main body by spring-loaded means which allow the extension to move vertically relative to the outlet and normally urge the extension downwards.

For use, the hopper now provided is mounted over the trough along which it is to travel such that the extension is resting, with some force from the spring-loaded means, on the trough, normally the inside surfaces of the opposite, sloping, side walls of the trough. The spring-loaded means retain the extension in contact with the trough at all times as the hopper travels along the trough. Therefore, although the heights of the trough and the main body of the hopper may vary as the hopper travels along the trough, the level of the food discharged into the trough as the hopper travels along it nevertheless remains constant.

The end walls of the extension, or parts of or on them, may be vertically adjustable to vary their heights above the bottom of the trough, and thereby vary the extent of the discharge of food from the hopper.

In our United Kingdom Patent Specification No. 1 087 658 a livestock feeding appliance is provided in which a continuous, linear member of open-work structure is disposed in and extends for the length of the trough, is anchored at its ends in fixed relation to the trough and extends through the hopper adjacent the lower end of a hopper which depends into the trough. The arrangement is such that in use as the hopper travels along the trough, spaces in the open-work member are filled with food as the hopper passes over them and the food in the spaces thus filled is subsequently deposited in the trough behind the hopper. The present invention may be applied to the hopper of such a feeding appliance. The end walls of the extension may have archways for the open-work member to pass through. The archways may be extended lengthwise of the device, that is lengthwise of the trough, and fit about the open-work member. The extended archways may be provided by inverted channel members at the bottom of the end walls.

The spring-loaded means may comprise compression springs acting in association with vertical guide members which guide the extension in its vertical movement. The guide members may be secured to the extension and be vertically slidable in supports fixed on the main body adjacent to the ends of the extension. Helical compression springs may act on the guide members to urge them, and thereby the extension, downwards.

Provision may be made for making the spring-loaded means inoperative, if required, so that the extension is fixed against vertical movement relative to the main body. For example, there may be transverse holes in the guide members into which pins are removably inserted which cooperate with the supports so as to restrain the rods from sliding in the supports.

As the birds or animals feed from the trough, there is a tendency for some of the food to be displaced and to build up against the inside surfaces of the side walls above the bottom of the trough. If the food is allowed to remain against the side walls, the next time the hopper travels along the trough it will deposit more food than is necessary because it will replace not only the food which has been eaten, but also that which has collected against the side walls. To avoid this excessive discharge of food, cleaning means may be provided on the main body adjacent to at least one end of the extension, which cleaning means, as the hopper travels along the trough it serves, wipes away any food in advance of the extension which has collected against the inside surfaces of the side walls of the trough, so that the food returns to the bottom of the trough. Thus the hopper will then only replace the food which has actually been eaten and food is saved. Since it is usual for a hopper to travel backwards and forwards along a trough and to discharge food into the trough in both directions of travel, cleaning means are conveniently provided adjacent to both ends of the extension. The or each cleaning means may comprise a scraper or scrapers, or brushes which engage with the side walls of the trough, and which may be adjustably mounted on the main body. The mounting may be provided, for example, by the support as aforementioned, in which one of the guide members is mounted.

An embodiment of the invention will now be described by way of example with reference to the accompanying drawings in which:

FIGS. 4 and 5 show alternative forms of cleaning means which may be mounted on the hopper.

Figure 1:
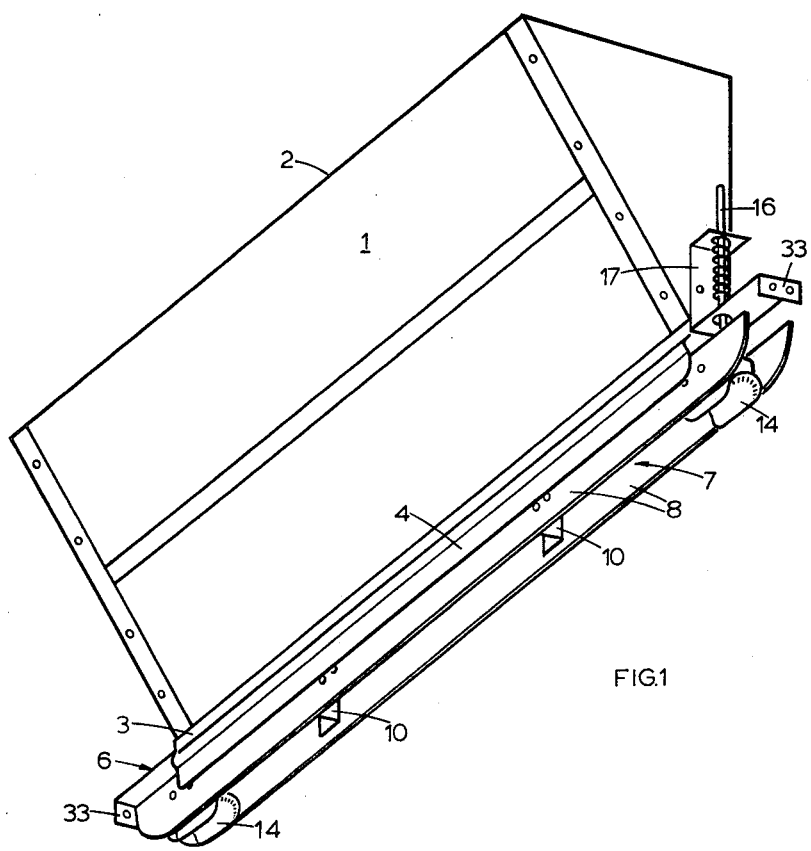
FIG. 1 is a perspective view of a hopper according to the present invention.

The hopper in this embodiment is intended for supplying food to a trough serving a row of cages in a poultry battery cage system.

The hopper has a main body 1 which is of substantially conventional form converging from a wide open top 2 to an open-bottomed, narrow rectangular neck portion 3, side walls 4 of which extend lengthwise of the trough which the hopper serves in use. The side walls 4 depend below the level of end walls 5 of the neck portion.

Figure 2:
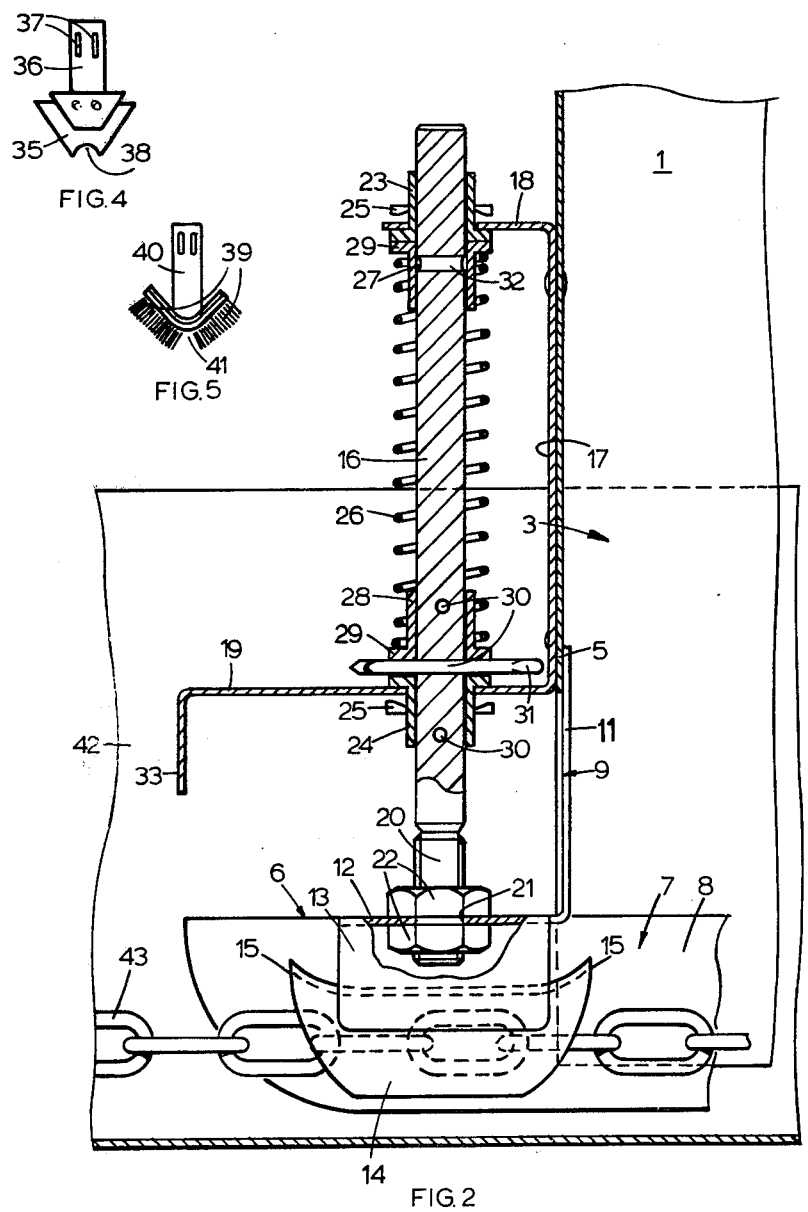
FIG. 2 is an englarged fragmentary section of one end of the hopper depending into a feeding trough.

At the bottom of the main body 1 a levelling device 6 is provided which comprises a downward extension 7 of the neck portion 3 located between the side walls 4 and below the end walls 5. The extension has two parallel side wall members 8 made of plastics having the form of sledge runners, and metal plate end wall member 9 fixed vertically between the side wall members near the ends of the latter. Spacers 10 are secured between the upper parts of the side wall members at intermediate positions between the end wall members 9. The spacers 10 strengthen the side wall members, as well as assisting in keeping them in a parallel relationship. Each end wall member 9 is of L-shape having, as shown in FIG. 2, a leg part 11 which extends up into the neck portion adjacent to the inside surface of the adjacent end wall 5 of the neck portion, and a foot part 12 which extends horizontally outwards below the end wall 5 and has depending side flanges 13. The side wall members 8 are riveted to the side flanges. Lower extremities of the side flanges 13 are bent inwards towards one another and are rigidly secured, as by brazing or welding, to opposite sides of an inverted, pressed metal channel member 14 of U-section with upswept ends 15. The channel member 14 forms an extended archway underneath the end wall member. The channel member and end wall member together define an end wall of the extension 7.

The extension 7 is supported at opposite ends of the neck portion by vertical guide rods 16 which are fixed to the end wall members 9, and slidably mounted on brackets 17 riveted to the outsides of the end walls 5. The brackets 17 each have vertically aligned top and bottom arms 18 and 19 respectively which extend horizontally from the end wall 5. Each guide rod 16 has an externally screw-threaded lower end portion 20 which is inserted in a plain hole 21 in the foot part 12 of the respective end wall member 9 and is secured by nuts 22 above and below the foot part. The guide rod passes slidably through externally flanged nylon bushes 23 and 24 located respectively in the top and bottom arms of the bracket 17, FIG. 2. The external flanges of the bushes seat against one of the faces of the arms and spring clips 25 fitted to the bushes adjacent the opposite faces of the arms secure the bushes to the arms. Between the bushes 23, 24 the guide rod is fitted with a co-axial helical compression spring 26 and two spring-locating bushes 27, 28 at opposite ends of the spring. These bushes are similar to the other two bushes, having external flanges 29 and being arranged so that the end portions of the spring pass over them, and the spring is thereby centralised on the guide rod, and the ends of the spring bear against the external flanges. At longitudinally spaced positions in the lower half of its length each guide rod has diametrical holes 30 in any one of which a pin 31 may be inserted between the bush 24 of the bottom arm 19 of the bracket and the adjacent spring-locating bush 28. The spring 26 urges the spring-locating bush 28 down on to the pin which is in turn urged down on to the bush 24. The spring action urges the guide rod downwards and the amount by which the lower portion projects below the bottom arm 19 of the bracket is dependent upon which of the holes 30 the pin is inserted into, and is thus adjustable. The extent of the downward projection determines the extent by which the extension depends from the neck portion of the hopper body.

Near its upper end each guide pin has a further diametrical hole 32 in which a further pin, not shown, may be inserted if it is desired to lock the guide rod against movement relative to the bracket, and thus lock the extension against movement relative to the hopper body. The pin is engaged with the hole 32 between the bush 23 on the top arm 18 of the bracket and the adjacent spring-locating bush 27.

The free ends of the bottom arms 19 of the bracket are bent vertically downwards to provide flanges 33. Horizontally spaced holes 34 are formed in the flanges. To these flanges 33 cleaning attachments of either of the forms shown in FIGS. 4 and 5 may be attached. Such attachments may be attached to the brackets at both ends of the hopper body, or just to the bracket which is at the leading end when the hopper is travelling along a feeding trough. The attachment shown in FIG. 4 comprises a scraper blade 35 of generally inverted triangular shape at the lower end of a mounting plate 36. The plate 36 has slots 37 which register with the holes 34 in the flange 33 of the appropriate bracket for bolting the attachment to the flange. The slots allow vertical adjustment of the attachment on the bracket. The downwardly sloping sides of the scraper blade 35 are arranged to scrape food from the inside surfaces of the side walls of the trough. An arcuate recess 38 in the bottom of the blade aligns with the adjacent channel member 14 of the extension 7, and is of substantially similar shape to the internal cross-section of the channel member. The other attachment shown in FIG. 5 comprises two brushes 39 disposed in a V-shaped configuration carried by a mounting plate 40 similar to that of the last-described attachment. The brushes are arranged to sweep food from the inside surfaces of the side walls of a trough. A gap 41 is left between the adjacent bottom ends of the brushes.

Figure 3:
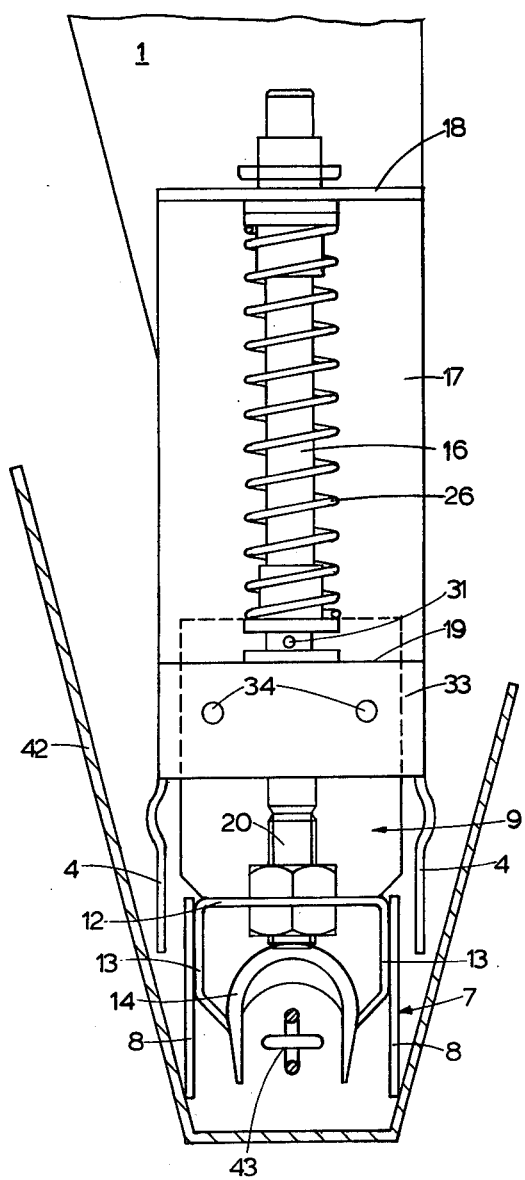
FIG 3 is an elevation of the part of the end of the hopper shown in FIG. 2 as viewed in the lengthwise direction of the trough.

The hopper described is suitable for use in supplying food to a trough 42 along which extends, as shown in FIGS. 2 and 3, a continuous, linear member 43 of open-work structure, as in the livestock feeding appliance which is the subject of United Kingdom Patent Specification number 1,087,658. As shown in the drawings, the linear member is in the form of a chain of the straight link type, but it may be of other suitable forms such as are mentioned in Patent Specification number 1,087,658. The neck portion of the hopper body depends into the trough, and the extension straddles the linear member 43, the side wall members 8 resting on the side walls of the trough and the channel members 14 fitting over the linear member. The spring loading on the guide rods 16 maintains the side wall members in contact with the trough even though there may be some variations in height between the trough and hopper, as the hopper travels along the trough. The linear member draws food from the hopper as the hopper passes over it and the channel members control the level to which food is deposited in the trough. As the extension remains at a constant level in the trough during its travel along the trough, the supply of food to the trough is kept constant. The cleaning attachment or attachments mounted on the brackets scrape or sweep any surplus food off the side walls of the trough and into the bottom of the trough, in front of the hopper. The arcuate recess 38 in the or each scraper blade 35 accommodates the linear member, as does the gap 41 between the brushes 39.

As will be appreciated, adjustment of the height of the extension is possible by selecting the appropriate hole 30 in each guide rod for engagement by the pin 31. Some adjustment can also be obtained by varying the extent by which the threaded lower end portion 20 of each guide rod is passed through the hole 21 in the foot part 12 of the end wall member 9 before it is secured by the nuts 22.

I claim:
1. A hopper for supplying food to a livestock feeding trough comprising a main body having an outlet at its lower end, and a food levelling device at said outlet which comprises a downward extension of said outlet having side and end walls, and spring-loaded means connected to said extension and said main body whereby said extension is supported by said main body, said spring-loaded means being constructed and arranged to allow said extension to move vertically relative to said outlet and normally to urge said extension downwards.

2. A hopper according to claim 1 wherein supports are fixed to said main body adjacent to opposite ends of said extension, and said spring-loaded means comprises vertical guide members adjacent to said end walls of said extension secured to said extension and slidably mounted in said supports, and compression springs which act on said guide members to urge them, and thereby said extension, downwards.

3. A hopper according to claim 2 wherein each said guide member comprises a rod which passes through a first bush and a second bush, and said spring bears at its opposite ends on said first and second bushes, said first bush being restrained from movement relative to said support under the action of said spring, and said second bush being tied to said guide member thereby to connect said spring operatively to said guide member.

4. A hopper according to claim 3 wherein a stop is fixed on each said support, said first bush on each said guide member is urged by said spring towards said stop, means is provided for adjustably locating said second bush on each said guide member axially along said guide member, a further stop is fixed on each said support and said second bush is urged by said spring towards said further stop so as to limit, variably, the downward movement of said guide member and thereby limit, variably, the downward movement of said extension.

5. A hopper according to claim 1 wherein each said guide member has transverse holes in it at axially spaced positions, and a pin is removably engageable with any selected on of said holes to locate said second bush in an adjusted axial position on said guide member, said pin abutting against said further stop to set a limit of downward movement of said guide member.

6. A hopper according to claim 1 wherein said end walls of said extension have archways at their lower ends.

7. A hopper according to claim 6 wherein said archways are extended lengthwise relative to said side walls of said extension.

8. A hopper according to claim 7 wherein said end walls comprise vertical end wall members having horizontally projecting parts, and inverted channel members are secured at the undersides of said projecting parts and form said archways.

9. A hopper according to claim 2 wherein said end walls comprise vertical end wall members having horizontally projecting parts and inverted channel members secured at the undersides of said projecting parts to form archways extending lengthwise relative to said side walls of said extension, and said guide members are secured to said projecting parts.

10. A hopper according to claim 9 wherein said guide members are secured to said projecting parts by means permitting vertical adjustment of said guide members, said vertical adjustment causing vertical adjustment of said end walls of said extension relative to said main body.

11. A hopper according to claim 1 wherein said side walls of said extension are in the form of sledge runners adapted to engage with the trough with which the hopper is associated in use.

12. A hopper according to claim 1 wherein locking means is releasably engageable with said spring-loaded means to make said spring-loaded means inoperative and thereby fix said extension against vertical movement relative to said main body.

13. A hopper according to claim 2 wherein said guide members have transverse holes in them, and pins are releasably engageable with said holes and co-operate with said supports to lock said guide members against sliding movement in said supports.

14. A hopper according to claim 1 wherein cleaning means is mounted on said main body adjacent to an end of said extension and is constructed and arranged to wipe food from the inside surfaces of the sides of the trough as the hopper travels along the trough in use.

* * * * *